Figure 1:
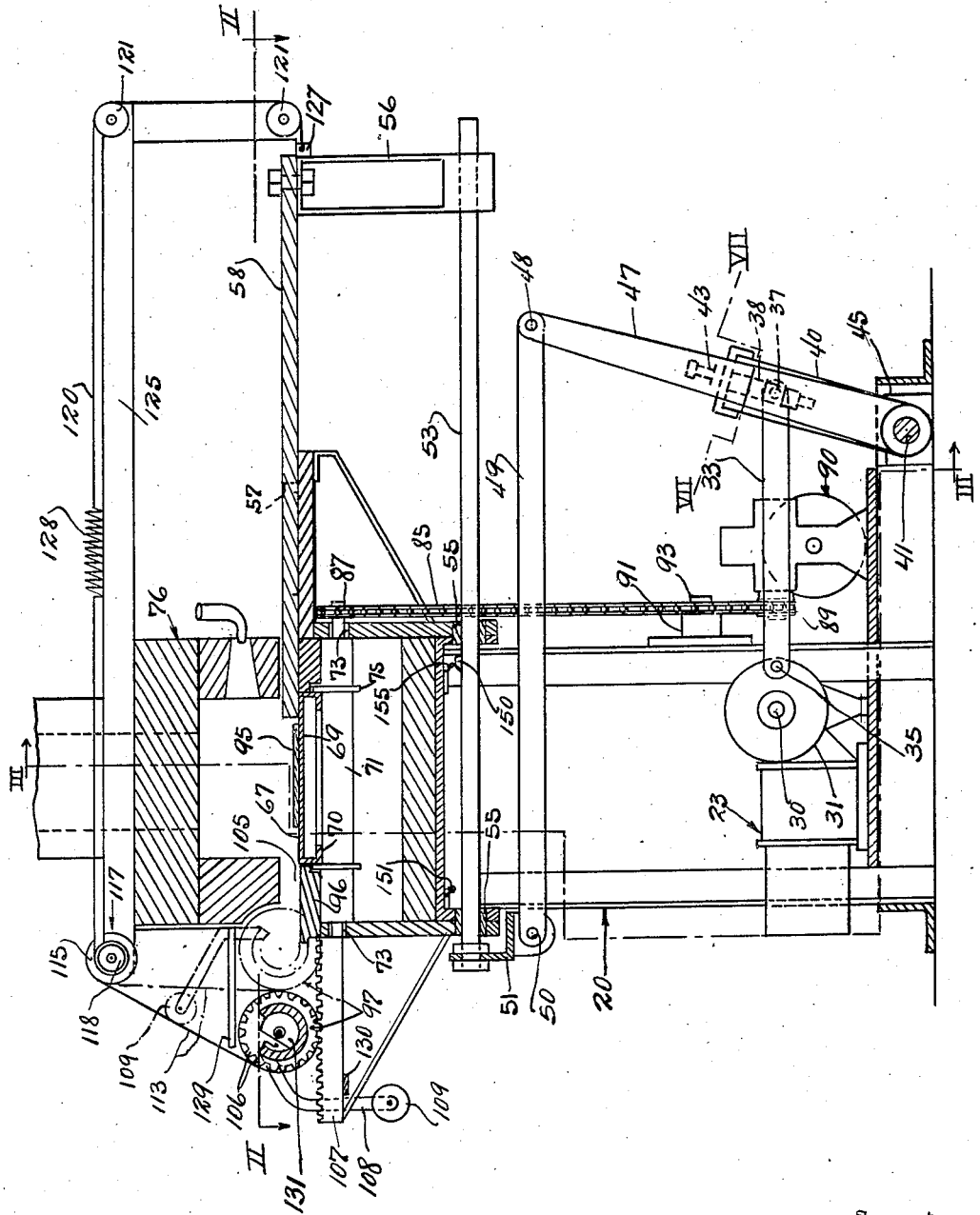

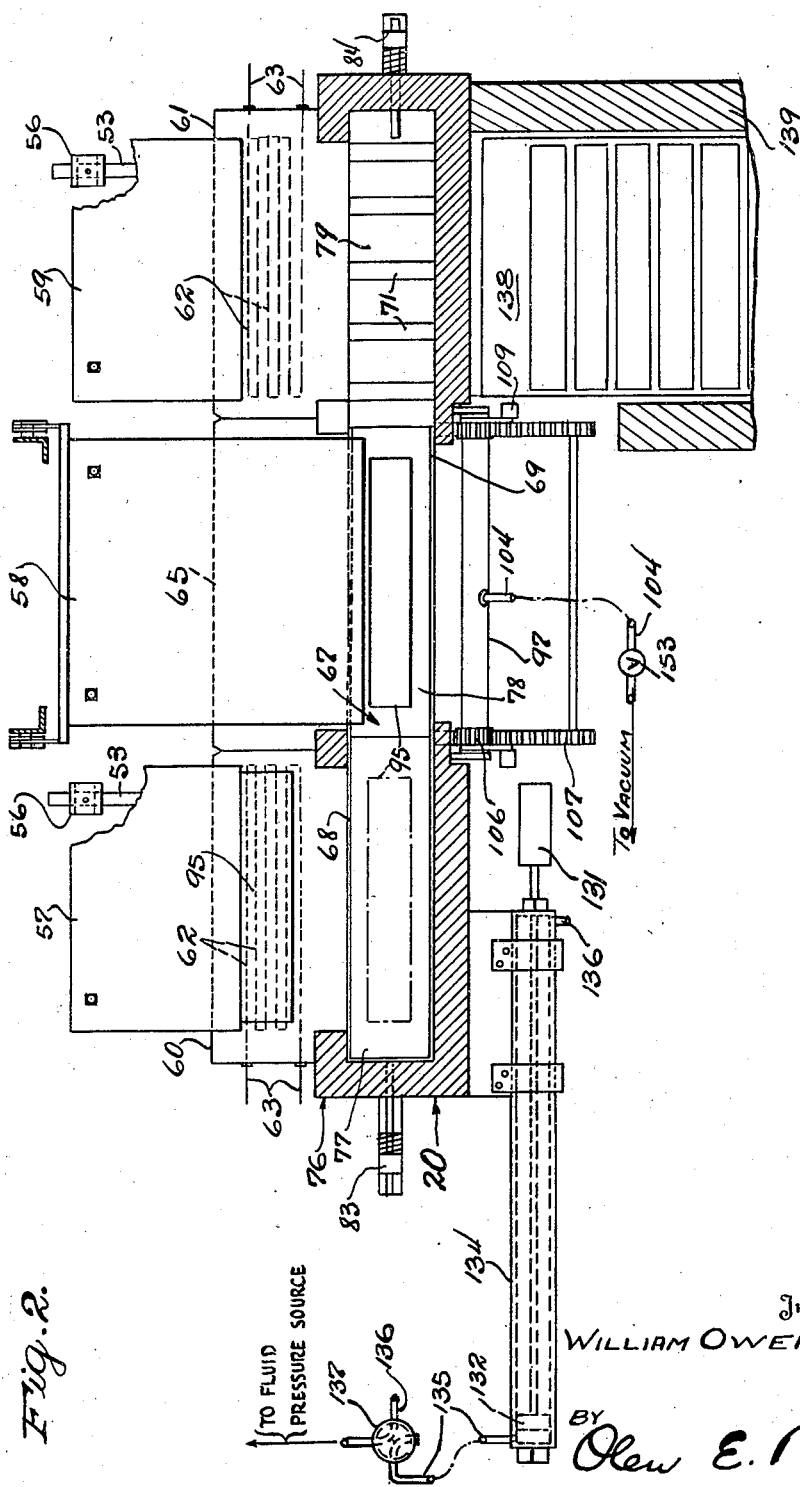

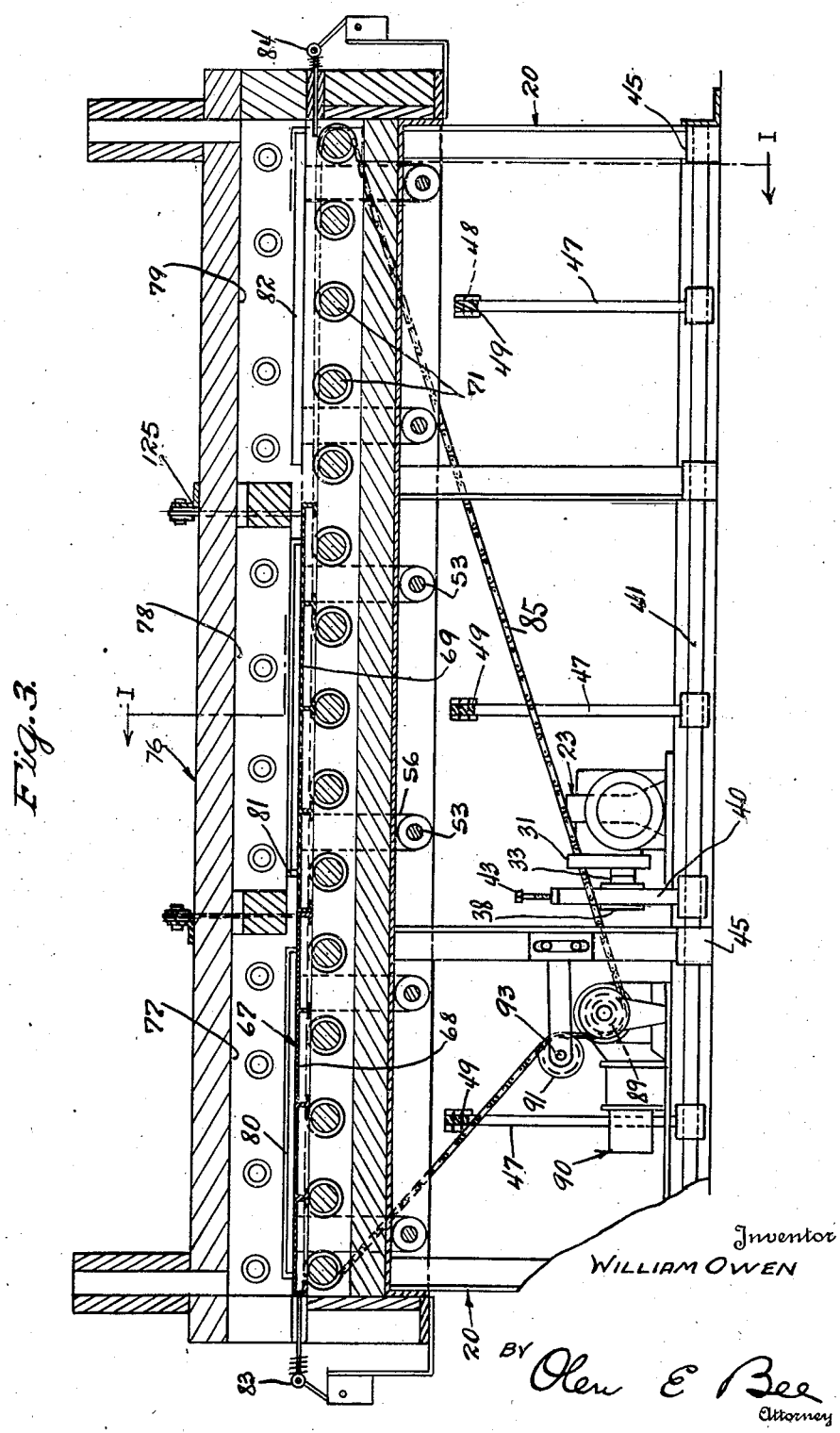

Feb. 27, 1945. W. OWEN 2,370,575
APPARATUS FOR BENDING GLASS
Filed Aug. 4, 1943 5 Sheets-Sheet 4
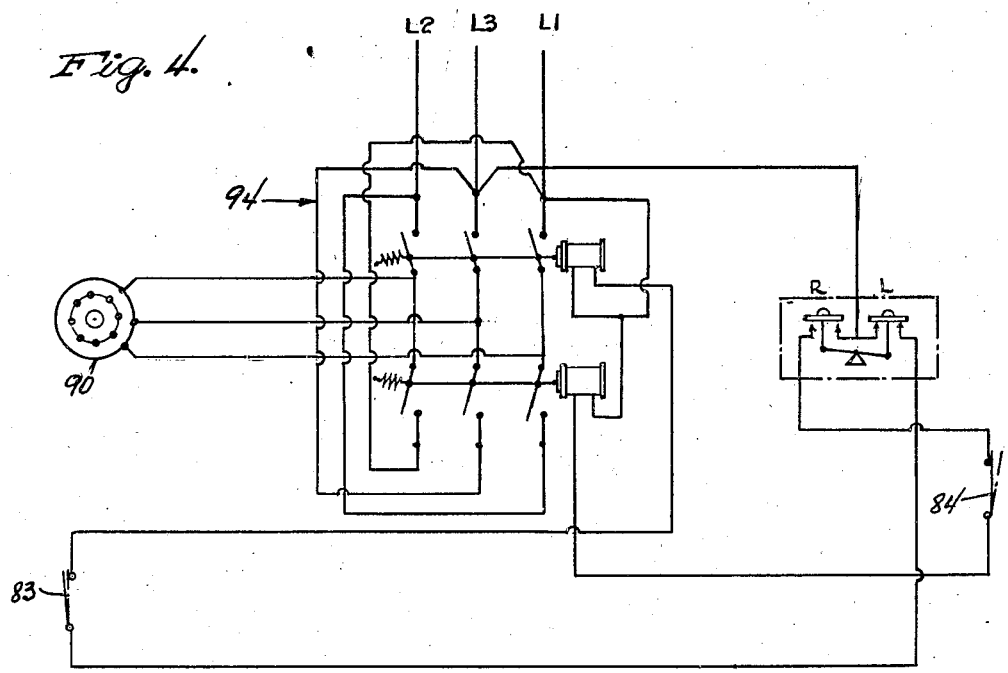
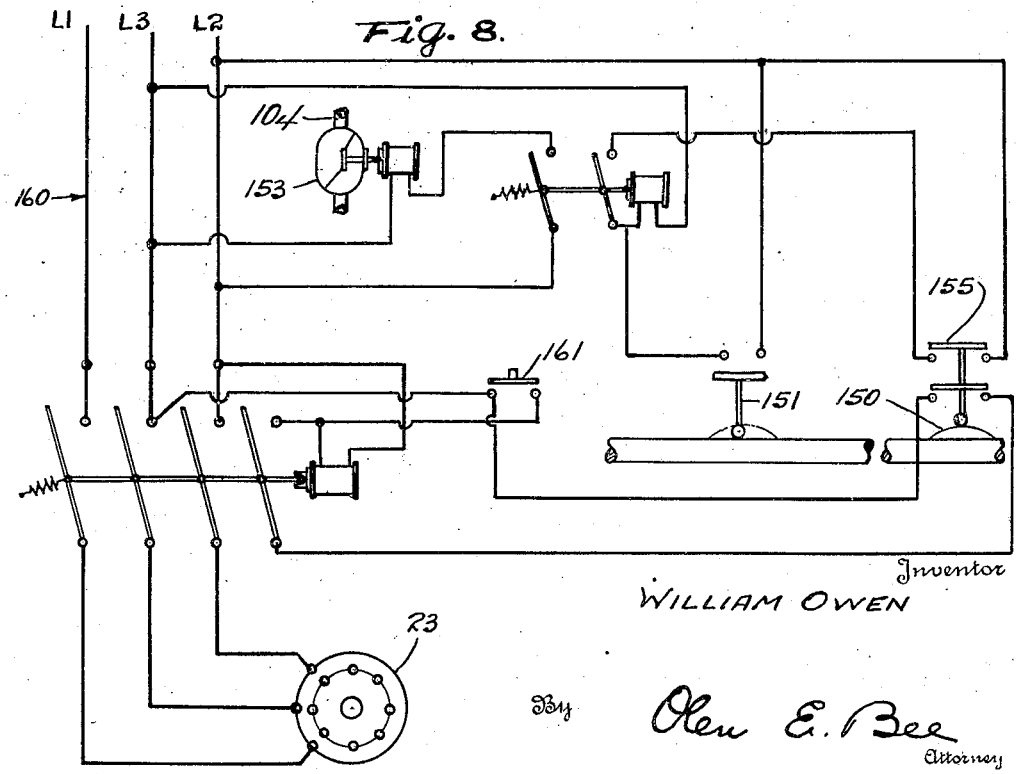
Inventor
WILLIAM OWEN
By Olen E. Bee
Attorney

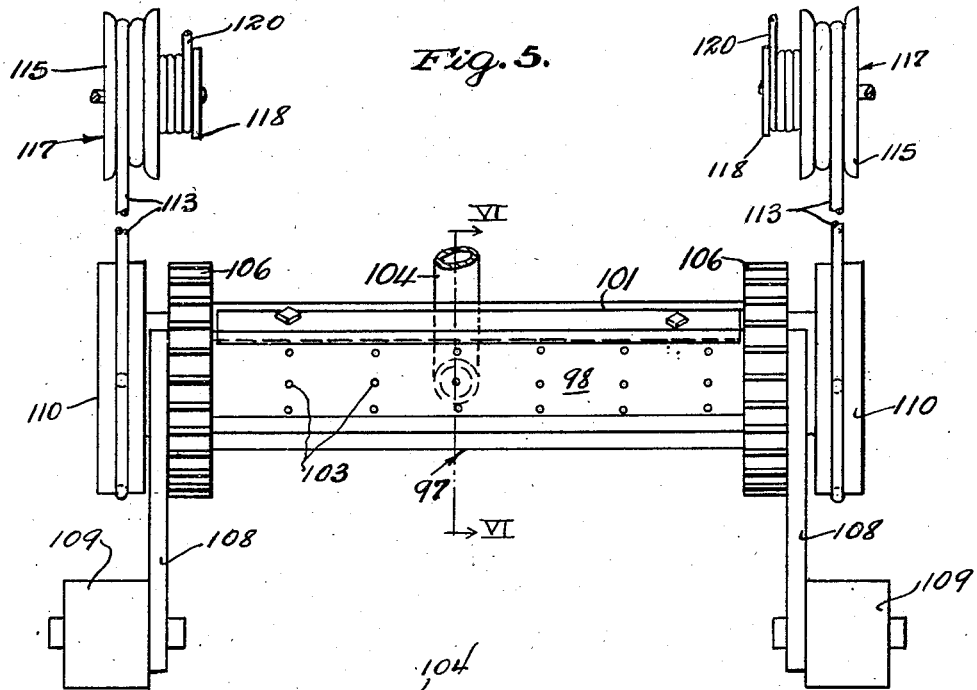
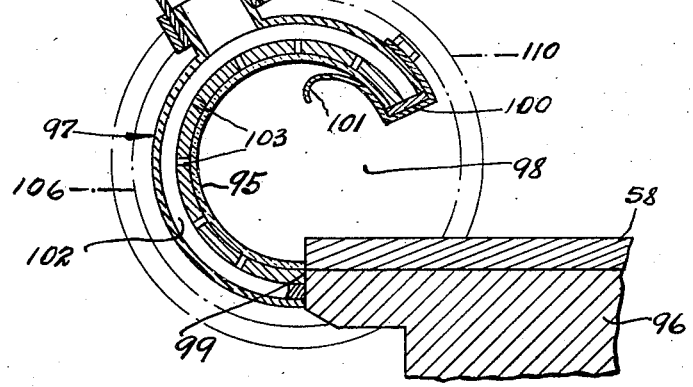
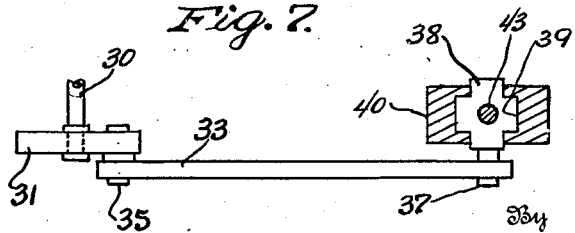

Patented Feb. 27, 1945

2,370,575

UNITED STATES PATENT OFFICE 2,370,575

APPARATUS FOR BENDING GLASS

William Owen, Pittsburgh, Pa., assignor to Pittsburgh Plate Glass Company, Allegheny County, Pa., a corporation of Pennsylvania Application August 4, 1943, Serial No. 497,318

13 Claims. (Cl. 49—7)

This invention relates to apparatus for bending sheet glass.

This application is a continuation in part of my copending application Serial No. 358,456, filed September 26, 1940.

One object of the invention is to provide an improved apparatus for bending sheet glass in such manner that relatively sharp curvatures can be formed.

Another object of the invention is to provide an improved apparatus for bending glass by which sheet glass can be bent to such extent as to be in the form of almost a complete cylinder.

Another object of the invention is to provide an improved apparatus for bending glass by frictional engagement of sheet glass with a curved surface.

Another object of the invention is to provide an improved apparatus for heating, handling and bending sheet glass.

In one form of the invention a sheet of glass is placed upon a platform and mechanically transported into a heating chamber where it is reduced to softening temperature. Thence the sheet glass is forced edgewise across a lip of a trough-like mold and along the inner surface thereof until the glass curves to the shape of the inner mold surface. The mold can be partially cylindrical or it can be polygonal in cross section. If desired, the mold can be formed with a vacuum chamber surrounding the molding surface and suction can be applied to assist in the bending operation after the glass has been forced into the mold. This type of bending operation obviates unfavorable differentials in thermal coefficients of expansion between the material of the mold and the glass. This is possible because the glass, after the molding action, contracts much more rapidly and to greater extent than the material of which molds are generally constructed. Moreover, the mold is not heated relatively as much as the glass. Hence, the glass can be removed from the mold without difficulty and without danger of breaking.

In the drawings:

Fig. 1 is a vertical section taken approximately along the line I—I of Fig. 3, of a glass bending apparatus; Fig. 2 is a horizontal section taken substantially along the line II—II of Fig. 1; Fig. 3 is a vertical section of the apparatus taken substantially at right angles to the section as illustrated in Fig. 1 and approximately along the line III—III of Fig. 1; Fig. 4 is a wiring diagram for controlling operation of a glass transporting carriage; Fig. 5 is a larger fragmentary plan of a mold structure included in the apparatus; Fig. 6 is a fragmentary cross section of a mold showing in detail its interior arrangement and taken approximately along the line VI—VI of Fig. 5; Fig. 7 is a fragmentary plan of a portion of driving connections employed in the apparatus, a portion of the supporting structure therefor being shown in the cross-section taken approximately along the line VII—VII of Fig. 1; and Fig. 8 is a wiring diagram for controlling operation of mechanical elements of the apparatus.

In practicing the invention, an apparatus frame 20 has rigidly secured thereon a conventional motor unit 23 disposed in driving relation with a crank shaft 30 that has a crank disc 31 rigidly secured thereto. A connecting rod 33 has one end thereof pivoted upon a crank pin 35 of the disc 31 and its other end has a pivotal connection 37 (Figs. 1 and 7) securing it to a block 38 that is mounted slidably in guides 39 of an upright arm 40. The latter arm forms a rigid actuating element for a horizontally disposed crank shaft 41. A screw threaded rod 43 is threaded vertically in the upper end of the arm 40 and in the block 38 to provide for adjusting the effective length of the arm. The horizontal crank shaft 41 is rotatably mounted in bearing members 45 formed in the apparatus frame.

A series of parallel crank arms 47 extending upwardly are rigidly mounted on the crank shaft 41 and have their upper ends pivotally connected, as indicated at 48, to the inner ends of links 49 which have their outer ends pivotally connected, as indicated at 50, and at right angles to a horizontally disposed rail 51. A plurality of parallel rods 53 are mounted horizontally for sliding action in bearings 55 formed in the frame and have end portions rigidly connected to the rail 51. Their ends opposite the rail 51 are secured by means of brackets 56 to horizontal pushers 57, 58 and 59. The outer or forward ends of the pushers 57 and 59 are movable horizontally along the upper surfaces of a pair of platform sections 60 and 61, respectively, that are heated electrically by means of resistance elements 62 energized through conductors 63. A central platform section 65 receives for sliding action thereon the central pusher 58. Reciprocation of the connecting rod 33 thus causes like reciprocation of the pushers 57, 58 and 59.

The three platform sections are arranged in substantially the same horizontal plane, and a horizontal carriage 67 is also arranged in substantially this same plane. A pair of platens 68 and 69 are formed as parts of the upper structure of the carriage which also includes side rails 70 resting upon horizontal parallel rollers 71 journalled in bearings 73 that are formed in the frame. Opposite end portions of these rollers are provided with flanges 75 along which the side rails 70 are fitted to guide the carriage in its longitudinal movement.

The upper portion of the frame is provided with a gas heated furnace 76 having three heating chambers 77, 78 and 79 (Fig. 3) in which the carriage 67 is movable in such manner that the platen 68 can be disposed in the chamber 77 while the other platen 69 is disposed in the chamber 78. Likewise the platen 68 can be disposed in the central chamber 78 while the other platen 69 is disposed in the chamber 79. The front edges of the pushers 57 and 59 are offset rearwardly from the front edge of the central pusher 58 in such manner that the pushers 57 and 59 are adapted to pass to, or slightly beyond, the rear edge of the carriage 67 while the front portion of the central pusher 58 is adapted to pass over or across the carriage. Relatively long slots 80, 81 and 82 are formed in the chambers for receiving the pushers 57, 58 and 59, respectively. Motor reversing limit switches 83 and 84 mounted on opposite extremities of the apparatus frame are actuated alternately by the carriage 67 as the latter reaches its limit of movement in opposite directions.

It is to be understood that the carriage 67 is movable in a direction at right angles to the lines of movement of the pushers and that the front edges of the latter are movable into the chambers over the surfaces of the platens 68 and 69. An endless flexible transmission member 85, which can be in the form of a sprocket chain, is trained about wheels 87 formed on the outer ends of the rollers 71 and an intermediate portion of this member is trained over a wheel 89 connected in driving relation to a motor unit 90. The motor unit 90 is automatically reversible in its action as controlled by the switches 83—84 and serves to move the carriage 67 in the chambers in the manner described above. An idler 91 rotatably mounted, as indicated at 93, upon the apparatus frame is disposed adjacent the motor unit 90 to provide for proper purchase of the chain on the driving wheel 89.

Electric wiring illustrated in the diagram 94 (Fig. 4) can be employed in connection with the operation of the motor unit 90 and switches 83—84 for controlling the operation of the carriage 67. Switches R and L are included in this wiring to initiate manually the operation of the motor unit after each alternate setting of the mechanism for reversal of such motor unit.

A plate of glass 95 is placed upon the platform section 60 and the motor unit 23 is operated to cause the pushers to move toward the heating chambers and the glass plate is thus pushed into the preheating chamber 77 upon the platen 69. In one cycle of operation of the unit 23, the pushers are moved forwardly to, and retracted from, the chambers as specified. After a predetermined period, during which the glass is preheated upon the platen 68 in the heating chamber 77, the carriage 67 is then operated by the motor unit 90 to move the platen 68 into the chamber 78 and also to move the platen 69 into the preheating chamber 79. Then the glass on the platen 68, then in chamber 78, is heated to higher temperature sufficiently to soften the glass, and in the meantime, another glass sheet is placed upon the platform 61. After the glass sheet 95 has been sufficiently heated, the motor unit 23 is again operated and the central pusher 58 forces the softened glass sheet across a bridge plate 96 into a mold 97, which is in the form of approximately a one-half or three-quarter cylinder (Figs. 5 and 6), and in which an opening 98 along one side thereof defines an entrance lip 99 together with an opposite lip 100, the latter of which is provided with an inwardly disposed guiding flange 101. The bridge plate 96 constitutes a part of the apparatus frame 20 and is a part of the glass supporting platform structure.

The interior of the mold is shaped to the curvature to which it is desired to bend the glass and it is to be understood that it can be formed to contours other than cylindrical curvatures. The mold 97 is formed with an internal chamber 102 (Fig. 6) following substantially the mold curvature and is provided with openings 103 communicating through the inner mold wall with the inner molding area. This chamber is connected in fluid tight relation to a flexible conduit 104 which is communicable with a suitable source of vacuum or partial vacuum (not shown).

The inner surface of the mold at its entrance edge 99 registers in flush relation with the top of the bridge 96 and this bridge defines with the adjacent wall portion of the chamber 78 a slot 105 through which the glass passes when forced into the mold.

The mold is provided adjacent its opposite ends with pinions or gears 106 which are supported in interfitting relation upon horizontal racks 107 carried rigidly upon the frame 20. Opposite end portions of the mold are also provided with angular arms 108 having weights 109 connected to their outer ends. Likewise opposite end portions of the mold structure are provided with drums 110, each of which receives a cable 113 secured and wound thereon. Each cable extends upwardly and is also secured and wound upon a larger section 115 of a double or reduction pulley unit 117. A smaller section 118 of each pulley unit has secured and wound thereon one end portion of a cable 120 which is directed back over the top of the apparatus frame and is trained over idler pulleys 121. All of these pulleys 118 and 121 are rotatably mounted upon a support 125 carried by the frame 20. The other end portion of each cable 120 is connected, as indicated at 127, to the rear portion of the pusher structure. Each cable 120 has an intermediate resilient section 128 which can be in the form of a coil spring.

At the beginning of the forward movement of the pushers to force the glass sheet into the mold, the latter is then disposed in its full line position shown in Fig. 1, and as the pushers move forwardly, the cables 113 and 120 rotate the mold and cause it to travel with the pinions 106 as the latter roll along the track defined by the racks 107. Before the glass sheet is forced into the mold, the latter will have rotated to the position indicated in broken lines of Fig. 1. The pinions 106 of the molds are prevented from being displaced from the racks 107 by means of horizontally disposed guides 129 mounted rigidly upon the frame immediately above the pinions.

The pulley sections 115 and 118 are so proportioned with respect to the pulleys 110 and to the stroke length of the pushers that the mold is moved to the broken line position (Fig. 1) where it is ready to receive the glass before the pusher 58 moves the glass across the bridge 96, although it can be in the process of being moved toward or across such bridge at this stage of operation. The entrance lip 99 of the mold at this stage of the operation is stopped or abutted against the edge of the bridge 96 with the beginning of the inner mold surface disposed in flush relation with the upper surface of the bridge. That is, the upper surface of the bridge is substantially tangential to the inner curvature of the mold at the lip 99. During further movement of the pusher 58 wherein the actual bending operation takes place, the cables 120 are stretched in their resilient sections 128, in opposition to the additional forward movement of the rear end of the cables 120 as they are carried forward by the pusher structure.

Upon withdrawal of the pushers the weights 109 exert sufficient force to cause the mold to roll on the racks 107 away from the chamber opening 105 to the full line position (Fig. 1) where it is stopped by a bar 130 that is carried transversely and rigidly upon the racks 107. In this position the mold registers lengthwise or axially with a ram 131 which is operated by fluid under pressure acting upon a piston 132 in a cylinder 134 that is carried upon the apparatus frame. Fluid under pressure is admitted through conduits 135 and 136 in a conventional manner and is controlled by a multiple valve 137 through which air can be supplied selectively to the two conduits. The ram forces the bent glass from the mold upon a conveyor 138 of a leer 139 of known type and through which the glass is transported and annealed. It is only necessary that the ram 131 be large enough to contact a portion of the edge of the molded glass, and hence, it is sufficiently small to pass freely by the flange 101, or it can be semi-cylindrical.

The ram can be operated by manually controlling the operation of the valve 137. At substantially the completion of the forward stroke of the pusher 58, a portion of the pusher structure, e. g., a cam lug 150 on one of the members 53, actuates a switch 151 which is operably connected to a conventional valve 153 (Fig. 2) in the conduit 104 for controlling the flow of fluid through this conduit. In connection with subjecting the chamber 102 to sub-atmospheric pressure or vacuum, the valve 153 is closed in response to the actuation of a double switch 155 by the lug 150 in the return movement of the latter. It is to be understood that this valve 153 can be operated manually if desired. Conventional electric wiring illustrated in a diagram 160 (Fig. 8) can be employed in connection with the control of the valve 153 and the operation of the motor unit 23 in each of its cycles of operation. Actuation of the switch 155 terminates each of these cycles of operation, and a push button switch 161 is included to initiate each cycle of operation.

From this description it will be apparent that the bent glass in the mold is subjected to subatmospheric pressure or vacuum approximately at the time the pusher 58 begins its return or back stroke and the glass is held momentarily while such back stroke is being completed. This action completes one cycle of operation of the motor unit 23 which is automatically stopped until the attendant again starts it.

After the mold remains in the full line position (Fig. 1) for such period as is required to permit the glass to become cool enough to shrink and set, the attendant then can manipulate the valve 137 to move the ram into the mold to slide the bent glass therefrom and deposit it upon the conveyor in the leer 139. Since the glass shrinks materially relative to the mold, no difficulty is experienced in sliding the glass out of the mold onto the conveyor.

Although illustrative structure incorporating the invention has been shown and described in detail, it will be apparent to those skilled in the art that the invention is not so limited, but that various changes can be made therein without departing from the spirit of the invention or from the scope of the appended claims.

What I claim is:

1. In a glass bending apparatus, a mold of trough form having spaced lips defining an opening along one side of the mold for receiving sheet glass, a support registerable in substantially horizontal relation with the inner surface of the mold at one lip thereof to provide substantially continuous surfaces from the support along the inner wall of the mold, means for bringing said support and said one lip into their registering relation, and means for moving the sheet glass along the support over the latter lip into the mold.

2. In a glass bending apparatus, a mold of trough form having spaced lips defining an opening along one side of the mold for receiving sheet glass, a support registerable in substantially flush relation with the inner surface of the mold at one lip thereof to provide substantially continuous surfaces from the support along the inner wall of the mold, means for bringing said support and said one lip into registering relation, heating means associated with the support for reducing the glass to softening temperature, and means for moving the sheet glass along the support into the mold.

3. In a glass bending apparatus, a mold of trough form having spaced lips defining an opening along one side of the mold for receiving sheet glass, heating means including a chamber disposed adjacent and opening toward the mold, a glass supporting carrier movable into and out of the chamber, actuating mechanism for moving the carrier, a device movable across the carrier into the chamber to force the glass sheet therefrom into the mold, and actuating means for moving said device.

4. In a glass bending apparatus, a mold of trough form having entrance lips defining an opening longitudinally along one side thereof, means for supporting a glass sheet adjacent the mold, means for heating the glass sheet to softening temperature, means for moving the mold into and out of position of alignment of the opening with the supporting means, and means for moving the glass sheet edgewise through the opening into the mold while the mold opening is in alignment with the supporting means.

5. In a glass bending apparatus, an open ended mold of trough form having entrance lips defining an opening longitudinally along one side thereof, means for supporting a glass sheet adjacent the mold, means for heating the glass sheet to softening temperature, means for moving the mold to and away from a position of alignment of said opening with the supporting means, means for moving the glass sheet edgewise through the opening into the mold while said opening is in alignment with the supporting means, a discharger alignable axially with the mold in its position away from the supporting means for removing the bent glass from the mold, and means for operating the discharger.

6. In a glass bending apparatus, a mold of trough form having entrance lips defining an opening longitudinally along one side thereof, means for supporting a glass sheet adjacent the mold, means for heating the glass sheet to softening temperature, track means supporting the mold in rolling relation to provide for movement thereof into and out of a position of alignment of its opening with the supporting means, said track means including horizontal racks, said mold including pinions engaging the racks, and means for moving the glass sheet edgewise through the opening into the mold while said opening is in alignment with the supporting means.

7. In a glass bending apparatus, a mold of trough form having entrance lips defining an opening longitudinally along one side thereof, means for supporting a glass sheet adjacent the mold, means for heating the glass sheet to softening temperature, mechanism for moving the mold in rolling relation into and out of a position of alignment of the opening with the supporting means, means for moving the glass sheet edgewise through the opening into the mold while the mold opening is in alignment with the supporting means, and said mechanism including means associated with the mold and constantly applying force tending to roll the mold away from the glass heating means.

8. In a glass bending apparatus, a mold of trough form having entrance lips defining an opening longitudinally along one side thereof, means for supporting a glass sheet adjacent the mold, means including a chamber opening toward the mold for heating the glass sheet to softening temperature, track means supporting the mold in rolling relation to carry the mold into and out of a position of alignment of the mold opening with the supporting means, an actuator for moving the glass sheet edgewise from the supporting means through the opening into the mold while the latter is in alignment with the supporting means.

9. In a glass bending apparatus, a mold of trough form having entrance lips defining an opening longitudinally along one side thereof, a carrier alignable with said opening for carrying a glass sheet adjacent the mold, means for heating the glass sheet to softening temperature on the carrier, said heating means including a plurality of chambers having apertures through which the glass is adapted to pass, means for moving the mold into and out of a position of alignment of the mold opening with the carrier, actuating means for moving the carrier, and means for moving the glass sheet edgewise from the carrier through the opening into the mold.

10. In a glass bending apparatus, a mold of trough form having entrance lips defining an opening longitudinally along one side thereof, a carrier alignable with said opening for carrying a glass sheet adjacent the mold, means for heating the glass sheet to softening temperature on the carrier, said heating means including preheating and final heating chambers, said chambers having a passageway connecting them and said final heating chamber being open toward the mold, said carrier being movable through said passageway to carry sheet glass from the preheating chamber to the final heating chamber, actuating means for moving the carrier, means for moving the mold into and out of position of alignment of the mold opening with the final heating chamber, and means for moving the glass sheet edgewise from the carrier in the final heating chamber through the opening into the mold while the mold opening is in alignment with said carrier.

11. In a glass bending apparatus, a mold of trough form having entrance lips defining an opening longitudinally along one side thereof, a furnace open at one side thereof toward the mold and having preheating and final heating chambers open to one another, a carrier movable in the furnace for transporting sheet glass from one chamber to the other, means for actuating the carrier, a platform disposed adjacent said carrier for supporting sheet glass, pusher structure having a portion movable transversely of the direction of movement of the carrier to move sheet glass from the platform onto the carrier and having another portion movable across the carrier to push sheet glass into the mold, and means for operating the pusher structure.

12. In a glass bending apparatus, a mold of trough form having entrance lips defining an opening longitudinally along one side thereof, a furnace open at one side toward the mold and having preheating and final heating chambers therein open to one another, a carrier operable back and forth in the furnace for transporting sheet glass from one chamber to the other, means for operating said carrier, a platform disposed adjacent said carrier to receive the glass, a pusher adjacent said furnace and movable transversely of the direction of movement of the carrier and movable to and from the preheating chamber, a second pusher movable transversely of the direction of movement of the carrier to move a sheet of glass from said carrier across the latter into the mold, and means for moving said pushers.

13. In a glass bending apparatus, a mold of trough form having spaced lips defining an opening along one side of the mold for receiving sheet glass, means for supporting the sheet glass substantially in alignment with one lip of the mold preparatory to edgewise movement of the glass into the mold, heating means associated with the support for reducing the glass to softening temperature, means for moving the glass sheet along the support into the mold, and means for applying sub-atmospheric pressure along the inner surface of the mold to hold the glass therein temporarily after the actuation of said glass into the mold.

WILLIAM OWEN.